Patented Sept. 27, 1949

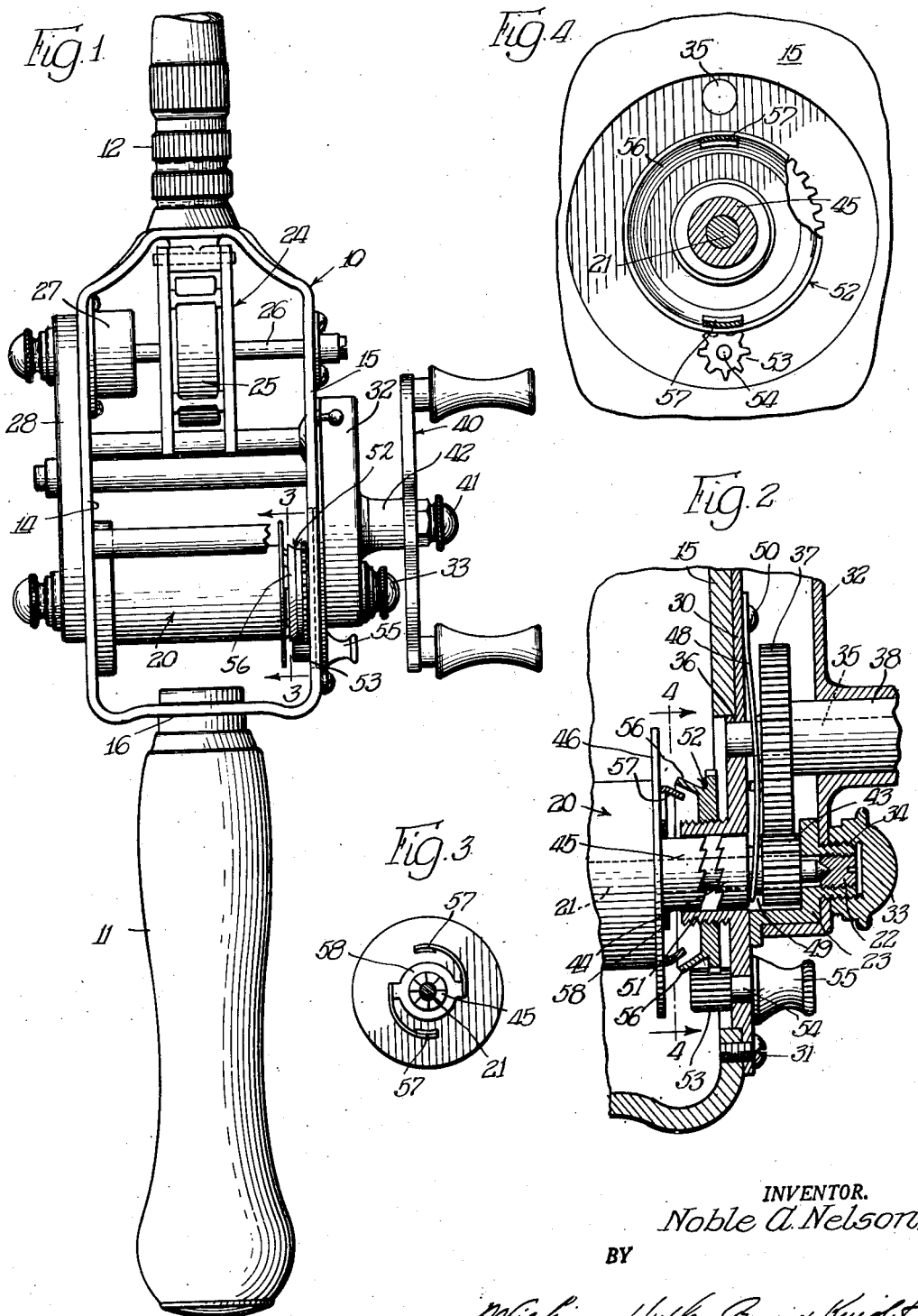

2,482,863

UNITED STATES PATENT OFFICE 2,482,863

SNUBBER FOR FISHING REELS

Noble A. Nelson, Chicago, Ill., assignor of one-fifth to Harold Freevol, one-fifth to Sam Smedberg, one-fifth to Howard Brandon, and one-fifth to Carl C. Anderson Application April 12, 1946, Serial No. 661,508

2 Claims. (Cl. 242—84.5)

1

The invention relates to improvements in fishing reels and has reference more particularly to a fishing reel having improved mechanism making it unnecessary to apply pressure to the spool or to the fishing line wound upon the spool to prevent overrunning thereof during a casting operation.

A general object of the invention is to provide improved snubbing mechanism for frictionally checking the speed of a freely rotating spool of a casting reel to control the speed of the same particularly during the initial stages of a casting operation whereby to prevent overrun such as would cause back-lash or tangling of the line.

One form of mechanism for accomplishing the above is disclosed in my Patent 2,380,670, granted July 31, 1945, wherein one or more governors are carried by the spool and which have movement as a result of centrifugal force upon rotation of the spool to effect a braking action, thereby checking excessive high speeds during the initial stages of the cast when a line is unwinding from the spool. At this time the speed of the reel is greatest and overrunning will take place unless controlled as heretofore mentioned. However, the braking action or snubbing effect of the governors as shown in said patent can not be regulated but, on the contrary, the snubbing effect is substantially uniform for any particular speed and depends on the weight of the governors which must be changed if a variation is desired.

Therefore, a specific object of the invention resides in the provision of improved snubbing mechanism for a fishing reel wherein the frictional braking effect of the centrifugal members can be regulated over a wide range to suit conditions which may vary, depending on the weight of the line used and length of the cast desired by the operator.

Another object is to provide adjustable snubbing mechanism of the centrifugal type which will be capable of regulation to vary the frictional braking action produced for any particular speed and which can also be set to substantially eliminate or render ineffective the braking action except possibly for very high speeds which will be checked to a slight extent.

Another object is to provide adjustable snubbing mechanism for the spool of a fishing reel and wherein the adjustment may be effected by the operator by means of a conveniently located knob on the exterior of the reel.

With these and other objects in view the invention may consist of certain novel features of construction and operation as will be more fully described and particularly pointed out in the specification, drawings and claims appended hereto.

In the drawings which illustrate an embodiment of the invention and wherein like reference characters are used to designate like parts—

Figure 1 is a top plan view of a fishing reel equipped with the improved snubbing mechanism of the invention;

Figure 2 is a fragmentary view in section showing a portion of the drive for the spool with the present snubbing mechanism in associated relation therewith;

Figure 3 is a detail sectional view taken substantially along line 3—3 of Figure 1; and Figure 4 is a sectional view taken substantially along line 4—4 of Figure 2.

Referring to the drawings, a reel embodying the improvements according to the present invention is represented generally by reference numeral 10 and which reel is formed as an element in an assembly including a handle 11 and a ferrule 12 adapted to receive the end of a casting rod which is socketed therein. The frame of the reel is formed by the side members 14 and 15 which have their ends in-turned to provide means for supporting the handle as at 16 at the rear of the frame structure and for supporting the ferrule 12 at the forward end of the same. The spool 20 is located between the side members and is journalled by shaft 21, Figure 2, which has a bearing in member 14 at one end and which extends through member 15 at the other end for support by the bearing structure 22 carried by bracket 23 which is in turn secured to member 15.

The spool has wound thereon the fishing line and by rotation in one direction the line is paid out, as in a casting operation, and then rewound on the spool by rotation of the same in an opposite direction. To control the paying out of the line and thus avoid back-lash and snarling difficulties the reel selected for illustrating the invention is provided with a line conveyor generally represented by the numeral 24 constituted in part by the roll 25, the shaft 26, overrunning clutch mechanism 27, and gearing housed within cover 28, which gearing operatively connects the line conveyor with the shaft 21 of the spool. The line conveyor is disclosed and claimed in my Patent 2,380,670 herein referred to and for a complete understanding of the structure and operation of said line conveyor, level winding mechanism and associated parts reference is made to said patent.

The drive for the spool is formed as a unit attached to the plate 30 releasably secured to frame 15 by screws such as 31 and which includes the bearing structure 22 and bracket 23, previously referred to. This operating unit is enclosed by a housing 32 secured in place through the medium of cap screw 33 threadedly engaging the threaded extension 34 of the bracket 23. The operating mechanism includes a stud shaft 35 journalled at its inner end, as at 36, by the plate 30 and which has mounted thereon a gear 37 provided with the sleeve 38 and which embraces the shaft. The sleeve has a threaded extension, not shown, adapted to receive the handle 40 and which is retained on the sleeve by cap screw 41. It will be seen that the sleeve is mounted for rotation in the bearing portion 42 of the housing 32.

The gear 37 is adapted to mesh with a pinion 43 rotatably and slidably mounted upon the end of spindle shaft 21 journalling the spool 20 and which pinion is formed integral with a clutch element 44. The clutch element 44 is formed with teeth on its inner face adapted to mesh with similar teeth on the face of the clutch element 45 fixedly secured to end plate 46 of the spool 20. A driving connection is thus provided from handle 40, including gear 37, pinion 43, clutch elements 44 and 45 to spool 20 effecting rotation of the spool upon rotation of the handle, provided, of course, the clutch elements 44 and 45 are in engagement. The operating mechanism is so constructed and arranged that said clutch elements automatically engage upon application of pressure to handle 40 to produce rotation of the handle in a direction to rotate spool 20 for winding the fishing line on said spool. Upon the termination of the winding operation the clutch elements automatically disengage. That is, element 44 will assume the position shown in Figure 2, in which position the spool is free to rotate for unwinding the line therefrom such as will occur in a casting operation. The automatic engagement and disengagement of the clutch elements 44 and 45 is effected through the provision of a leaf spring member 48 bifurcated at both ends to provide spaced arms which straddle the stud shaft 35 and spaced arms which have location in slot 49 formed between the pinion 43 and the clutch element 44. The leaf spring member is properly positioned with respect to gear 37 and pinion 43 and then secured to the plate 30 by means of screws such as 50 which fasten the bifurcated arms at this end of the member to said plate.

The action of the leaf spring member is to maintain clutch element 44 out of engagement with 45 under normal conditions whereby the spool is thus free to rotate as described. However, upon initiating a retrieving operation for rewinding the line upon the spool the leaf spring will be actuated by mechanism incorporated within a recess formed in the face of gear 37 to cause sliding movement of clutch element 44 in a direction toward the left, Figure 3, whereby the clutch elements are brought into operative relation, effecting rotation of the spool as the handle is rotated. The mechanism within the recess formed in gear 37 is not shown since it forms no part of the present invention. For an understanding of the structure and operation of said mechanism in causing action of the leaf spring member as described reference is made to my Patent 2,380,670 previously mentioned.

It is necessary to have a freely rotating spool for paying out the line as may be required during a casting operation. However, during the initial stages of a cast the spool may rotate at a high speed such as would pay out the line at a rate in excess of that desired, with the result that the line may become entangled and require efforts on the part of the operator to straighten the same before proceeding with another cast. The invention provides improved snubbing mechanism for controlling the spool during said initial stages and which mechanism is capable of regulation so that the braking effect can be regulated over a wide range to suit conditions which may vary depending on the weight of the line used and the length of the cast desired by the operator.

The plate 30, as shown in Figure 2, is provided with a trunnion portion 51 having encircling relation with the clutch elements and which is exteriorly threaded for receiving the combination gear and snubbing member 52. Rotation of said member will produce axial movement of the same by reason of its threaded mounting on the trunnion 51 and which movement is in a direction axially of the spool 20. In other words, rotation of member 52 in one direction will produce movement of the same toward the end plate 46 of said spool and rotation in an opposite direction will cause movement of the member toward the plate 30. Means are provided whereby the operator may effect rotation of said combination gear and snubbing member, the same including the pinion 53 having a shaft 54 mounted for rotation in plate 30 and which extends through and beyond the plate for receiving the knob 55. The pinion 53 meshes with the gear on member 52 to rotate the same upon rotation of knob 55, the same being located exteriorly of the fishing reel in a convenient place readily accessible to the operator.

The member 52 includes the conical drum 56 and which is formed integral therewith, the same providing the braking or snubbing part of said combination member. The conical drum has surrounding relation so as to enclose the centrifugal members 57 of spring metal and which comprise resilient extensions of the disc 58 secured to plate 46. The terminal ends of said members 57 are directed inwardly, having approximately parallel relation with the conical inner surface of the drum 56. By rotation of knob 55 it will be understood that the operative relation between drum 56 and members 57 can be varied. This variation between the said parts renders it possible to regulate the speed of the spool as described whereby to suit conditions such as the weight of the line and length of cast desired.

Upon rotation of the spool 20 the members 57 of spring metal will move outwardly under the influence of centrifugal force and if the speed of the spool is sufficiently high the members will be caused to engage the drum 56. Said drum acts as a brake to control the speed of the spool and its braking action can be regulated by adjusting the position of the drum with respect to the members 57. Rotation of the knob 55 will rotate member 52 and cause it to move toward or away from the spool. Therefore means are provided by the invention capable of minute adjustment for obtaining the desired snubbing effect on the spool of a casting reel.

What is claimed is:

1. In a reel, the combination of a frame, a spool journalled in said frame by a spindle shaft, operating mechanism for said spool including a gear rotatably mounted on said shaft and capable of bodily movement axially, clutch mechanism between said gear and spool including a clutch element provided by said gear and another clutch element fixed to the adjacent end of the spool, resilient members carried by said end of the spool in concentric relation with the clutch element fixed to said end, said resilient members having radial movement outwardly as a result of centrifugal force upon rotation of the spool, a drum member providing outwardly diverging conical surfaces directed toward the said end of the spool, means forming part of the frame for mounting the drum member in concentric relation with the spindle shaft adjacent said resilient members so as to enclose the members and for movement axially toward and from the spool, and manually actuated means for adjusting the position of the drum member axially.

2. In a fishing reel, the combination of a frame, a spool journalled by the frame so as to rotate freely, a trunnion provided by the frame adjacent one end of the spool and in concentric relation with the axis of rotation of the spool, a drum member threadedly mounted on the trunnion whereby rotation of the drum member will move the same axially toward and from said end of the spool, centrifugally actuated friction devices carried by said end of the spool and having location within the drum member, said drum member providing outwardly diverging conical surfaces directed toward said end of the spool, and manually actuated means for effecting rotation of the drum member to adjust the position of the same axially of the trunnion, said means including a pinion mounted for rotation by the frame and having meshing relation with a gear provided by the drum member.

NOBLE A. NELSON.

REFERENCES CITED

The following references are of record in the file of this patent:

UNITED STATES PATENTS

| Number | Name | Date |
|---|---|---|
| 948,026 | Scotchmer | Feb. 1, 1910 |
| 1,276,367 | Ide | Aug. 20, 1918 |
| 1,347,529 | Werry | July 27, 1920 |
| 1,974,333 | Hirsch | Sept. 18, 1934 |
| 2,174,529 | Proctor | Oct. 3, 1939 |
| 2,380,670 | Nelson | July 31, 1945 |

FOREIGN PATENTS

| Number | Country | Date |
|---|---|---|
| 5,531 | Great Britain (1914) | Nov. 5, 1914 |